United States Patent
Su et al.

(10) Patent No.: US 8,208,768 B2
(45) Date of Patent: Jun. 26, 2012

(54) FOCUSING MEMBER AND OPTOELECTRONIC DEVICE

(75) Inventors: Tzung-I Su, Yunlin County (TW);
Ming-I Wang, Taipei County (TW);
Bang-Chiang Lan, Taipei (TW);
Te-Kan Liao, Hsinchu (TW); Chao-An Su, Kaohsiung County (TW); Hui-Min Wu, Hsinchu County (TW); Chien-Hsin Huang, Taichung (TW); Tzung-Han Tan, Taipei (TW); Min Chen, Taipei County (TW); Meng-Jia Lin, Changhua County (TW)

(73) Assignee: United Microelectronics Corp., Hsinchu (TW)

( * ) Notice: Subject to any disclaimer, the term of this patent is extended or adjusted under 35 U.S.C. 154(b) by 312 days.

(21) Appl. No.: 12/605,891

(22) Filed: Oct. 26, 2009

(65) Prior Publication Data
US 2011/0097033 A1 Apr. 28, 2011

(51) Int. Cl.
*G02B 6/12* (2006.01)
(52) U.S. Cl. .......................................................... 385/14
(58) Field of Classification Search ........................ None
See application file for complete search history.

(56) References Cited

U.S. PATENT DOCUMENTS

| | | | |
|---|---|---|---|
| 5,691,246 A | 11/1997 | Becker et al. | |
| 6,177,297 B1* | 1/2001 | Chen et al. | 438/132 |
| 6,227,211 B1 | 5/2001 | Yang et al. | |
| 6,288,436 B1* | 9/2001 | Narayan et al. | 257/529 |
| 6,835,642 B2* | 12/2004 | Yang et al. | 438/601 |
| 7,440,660 B1* | 10/2008 | Jin et al. | 385/43 |
| 7,544,992 B2 | 6/2009 | Shih et al. | |
| 7,622,395 B2 | 11/2009 | Bai et al. | |
| 7,759,244 B2 | 7/2010 | Wang | |
| 7,821,038 B2* | 10/2010 | Ko et al. | 257/207 |
| 2007/0072326 A1 | 3/2007 | Zheng et al. | |
| 2008/0036020 A1 | 2/2008 | Ko et al. | |
| 2008/0116537 A1* | 5/2008 | Adkisson et al. | 257/448 |
| 2008/0217667 A1* | 9/2008 | Wang | 257/292 |
| 2009/0065820 A1 | 3/2009 | Kao | |
| 2011/0115040 A1 | 5/2011 | Su et al. | |
| 2011/0258581 A1* | 10/2011 | Hu | 715/811 |

* cited by examiner

*Primary Examiner* — Tina Wong
(74) *Attorney, Agent, or Firm* — WPAT., P.C.; Justin King

(57) ABSTRACT

A focusing member and an optoelectronic device having the same are provided. The focusing member includes multiple levels of conductive plugs and multiple levels of conductive layers that together form an inversed half-boat shape. The optoelectronic device includes a bottom layer, an optical waveguide above the bottom layer, a dielectric layer covering the optical waveguide, and the above focusing member disposed at an edge of the optoelectronic device and located in the dielectric layer above the optical waveguide. A wider end of the inversed half-boat shape of the focusing member faces the outside of the optoelectronic device. The refractive indexes of the bottom layer and the dielectric layer are smaller than that of the optical waveguide.

10 Claims, 2 Drawing Sheets

FOCUSING MEMBER AND OPTOELECTRONIC DEVICE

BACKGROUND OF THE INVENTION

1. Field of the Invention

This invention relates to an optoelectronic device, and more particularly relates to a focusing member, and an optoelectronic device that includes the focusing member to receive optical signals and converts the optical signals into electrical signals.

2. Description of Related Art

An optoelectronic device capable of receiving optical signals and converting the same into electrical signals typical includes a coupler for receiving optical signals from an optical signal source like an optical fiber, a modulator for converting the received optical signals into electrical signals, and an integrated circuit for controlling the modulator, wherein the optical signals are transmitted by an optical waveguide.

A conventional method for fabricating such optoelectronic device is to foam an integrated circuit including complementary metal-oxide-semiconductor (CMOS) transistors on a chip, form optical members including a coupler, an optical waveguide and so forth on another chip, and then connect the chips by wires. However, such fabricating method is complicated and time and cost consuming.

SUMMARY OF THE INVENTION

This invention is directed to a focusing member, which can be fabricated on the same chip with an integrated circuit.

This invention is also directed to an optoelectronic device including the above focusing member.

The focusing member of this invention includes multiple levels of conductive plugs and multiple levels of conductive layers, wherein the conductive plugs and the conductive layers in combination form an inversed half-boat shape.

In an embodiment, the conductive plugs and the conductive layers include metal.

In an embodiment, the focusing member is disposed at an edge of an optoelectronic device above an optical waveguide of the optoelectronic device, wherein the wider end of the inversed half-boat shape faces the outside of the optoelectronic device. The conductive plugs and the conductive layers are located, for example, in an inter-layer dielectric (ILD) layer and a plurality of inter-metal dielectric (IMD) layers. The optical waveguide may be defined from the silicon of a silicon-on-insulator (SOI) substrate, or from a polysilicon layer formed on an insulating layer embedded in a bulk substrate.

The optoelectronic device of this invention includes a substrate, a bottom layer on the substrate, an optical waveguide over the bottom layer, a dielectric layer covering the optical waveguide, and an above focusing member disposed at an edge of the optoelectronic device and located in the dielectric layer over the optical waveguide. The wider end of the inversed half-boat shape of the focusing member faces the outside of the optoelectronic device. The refractive indexes of the bottom layer and the dielectric layer are smaller than that of the optical waveguide.

In an embodiment, the conductive plugs and the conductive layers include metal.

In an embodiment, the bottom layer includes silicon oxide, and the optical waveguide includes silicon.

In an embodiment, the substrate is a silicon-on-insulator (SOI) substrate, the bottom layer is the insulator of the SOI substrate, and the optical waveguide is defined from the silicon of the SOI substrate.

In an embodiment of this invention, the substrate is a bulk substrate, the bottom layer is an insulating layer embedded in the bulk substrate, and the optical waveguide is defined from a polysilicon layer formed on the insulation layer.

In an embodiment, the optoelectronic device further includes an integrated circuit fabricated on the substrate, wherein the integrated circuit includes a multi-level interconnect that is located in the dielectric layer and is formed simultaneously with the conductive plugs and the conductive layers. The multi-level interconnect, the conductive plugs and the conductive layers may include metal. The dielectric layer may include an ILD layer and a plurality of IMD layers. When the substrate is an SOT substrate, the bottom layer is the insulator of the SOI substrate, and the optical waveguide and the active layer of the integrated circuit are defined from the silicon of the SOT substrate. When the substrate is a bulk substrate, the bottom layer is an insulating layer embedded in the bulk substrate, and the optical waveguide and the gates of the CMOS transistors in the integrated circuit are defined from a polysilicon layer formed on the bulk substrate.

Since the focusing member of this invention includes multiple levels of conductive plugs and multiple levels of conductive layers, its fabricating process can be integrated with the fabricating process of the multi-level interconnect of the integrated circuit, so that the process time and cost are much reduced.

In order to make the aforementioned and other features and advantages of this invention comprehensible, several exemplary embodiments accompanied with figures are described in detail below.

DESCRIPTION OF THE EMBODIMENTS

Embodiments are provided below to further describe this invention, which are not intended to limit the scope of this invention.

Figure 1:
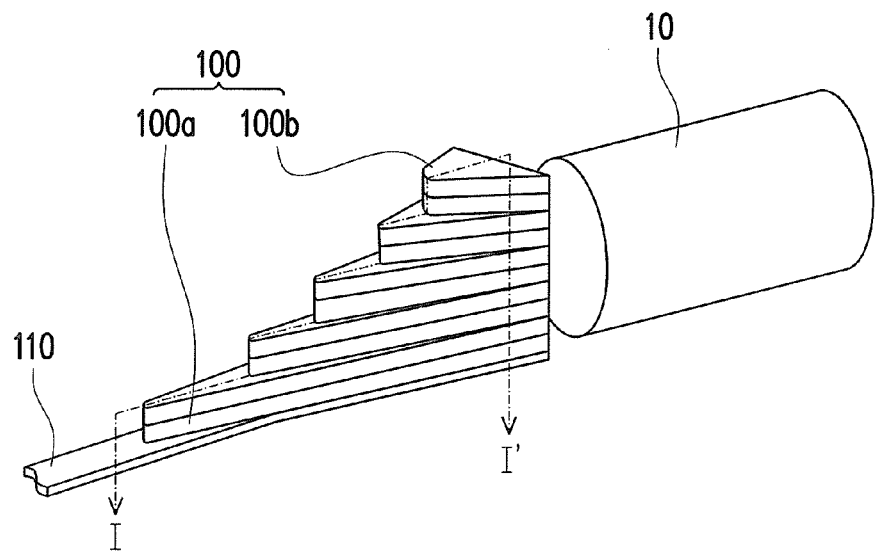
FIG. 1 illustrates a focusing member, the underlying optical waveguide and the arrangement of the focusing member, the optical waveguide and an optical fiber as an optical signal source, according to the embodiments of this invention.
Figure 2:
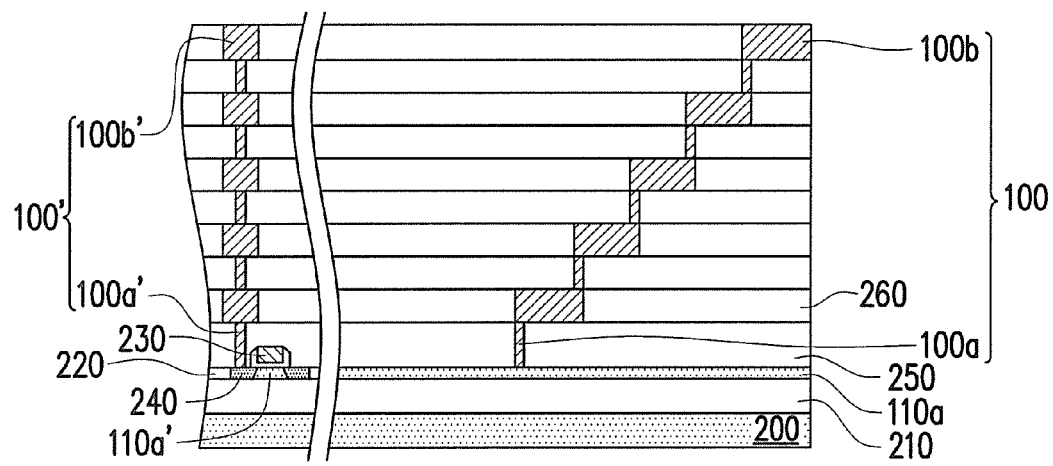
FIG. 2 is a schematic cross-sectional view of an optoelectronic device according to a first embodiment of this invention, including a cross-sectional view of the focusing member in FIG. 1 along the line I-I'.

FIG. 1 illustrates a focusing member, the underlying optical waveguide and the arrangement of the focusing member, the optical waveguide and an optical fiber as an optical signal source, according to the embodiments of this invention. FIG. 2 is a schematic cross-sectional view of an optoelectronic device according to the first embodiment of this invention, including a cross-sectional view of the focusing member in FIG. 1 along the line I-I'.

Referring to FIGS. 1-2, the focusing member 100 is disposed at an edge of the optoelectronic device (FIG. 2), which includes multiple levels of conductive plugs 100a and multiple levels of conductive layers 100b and is disposed over the optical waveguide 110a. The conductive plugs 100a and conductive layers 100b are stacked alternately from top to bottom, and are all bended except the upmost conductive layer 100b. The upper the level of a conductive plug 100a or conductive layer 100b is, the smaller the lateral dimensions of the same is, such that the conductive plugs 100a and the conductive layers 100b in combination form an inversed half-boat shape. The wider end of the inversed half-boat shape faces the outside of the optoelectronic device, so as to focus most of the light coming from the optical fiber 10 to the boat head. The light focused at the boat head will enter the optical waveguide 110a to be transmitted to a modulator (not shown).

The material of each of the conductive plugs 100a and the conductive layers 100b is, for example, metal like tungsten, titanium, titanium nitride, tantalum, tantalum nitride, copper, aluminum or a combination thereof or an alloy thereof, etc., and the conductive plugs 100a and the conductive layers 100b are located in a dielectric layer covering the optical waveguide 110a. As shown in FIG. 2, the dielectric layer may include an inter-layer dielectric (ILD) layer 250 and a plurality of inter-metal dielectric (IMD) layers 260. The focusing member 100 and a part of the ILD layer 250 and a part of the IMD layers enclosed by the focusing member 100 in combination faun a coupler of the optoelectronic device.

Referring to FIG. 2 again, the optoelectronic device of the first embodiment includes a silicon-on-insulator (SOI) substrate 200, an optical waveguide 110a and an active layer 110a' of an integrated circuit defined from the silicon of the SOI substrate 200, a dielectric layer including an ILD layer 250 and a plurality of IMD layers 260 and covering the optical waveguide 110a and the active layer 110a', and an above focusing member 100 and a multi-level interconnect 100' of the integrated circuit located in the dielectric layer. The insulator 210 of the SOI substrate 200 serves as a bottom layer under the optical waveguide 100a, generally including silicon oxide. Since the refractive indexes of the bottom layer 210 and the ILD layer 250 are smaller than that of silicon, the light entering the silicon optical waveguide 100a is not liable to escape out, so that a loss in the signal magnitude is prevented.

The focusing member 100 is located at an edge of the optoelectronic device, and is formed simultaneously with the multi-level interconnect 100'. Namely, each level of conductive plug 100a in the focusing member 100 is formed together with the conductive plug 100a' in the same level of the multi-level interconnect 100', and each level of conductive layer 100b in the focusing member 100 is formed together with the conductive layer 100b' in the same level of the multi-level interconnect 100'. The material of each level of conductive plug 100a/a' or conductive layer 100b/b' is, for example, metal like tungsten, titanium, titanium nitride, tantalum, tantalum nitride, copper, aluminum, or a combination thereof or an alloy thereof etc.

Moreover, a device isolation 220 is formed in the aforementioned silicon layer to define the active layer 110a', the gates 230 of the CMOS transistors are formed over the active layer 110a', and the source/drain regions 240 of a NMOS or PMOS transistor is formed in the active layer 110a' beside the gate 230 of the transistor.

Figure 3:
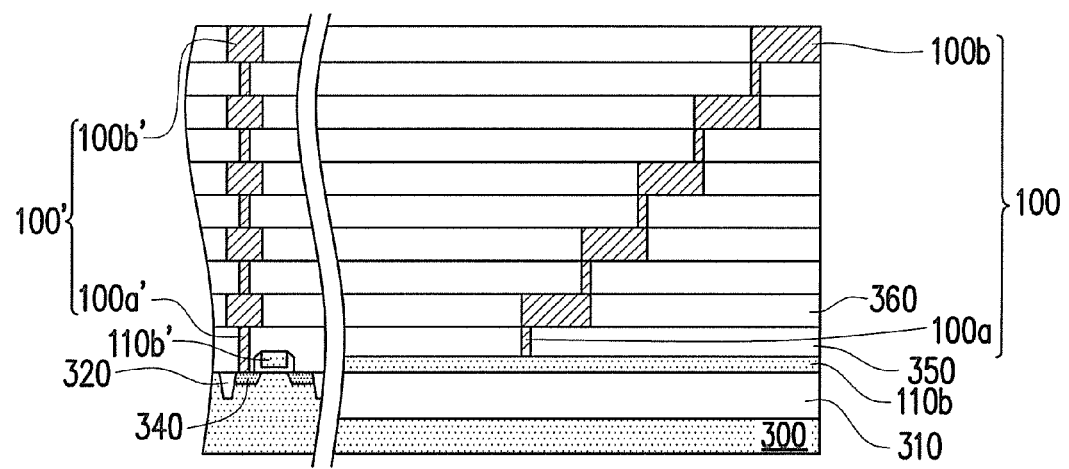
FIG. 3 is a schematic cross-sectional view of an optoelectronic device according to a second embodiment of this invention, including a cross-sectional view of the focusing member in FIG. 1 along the line I-I'.

FIG. 3 is a schematic cross-sectional view of an optoelectronic device according to the second embodiment of this invention, including a cross-sectional view of the focusing member in FIG. 1 along the line I-I'.

In the optoelectronic device of the second embodiment, the focusing member 100 also includes multiple levels of conductive plugs 100a and multiple levels of conductive layers 100b disposed in a dielectric layer that includes an ILD layer 350 and a plurality of IMD layers 360 and covers the optical waveguide 110b. The differences between the second embodiment and the first embodiment include that the substrate is a bulk substrate 300, that the bottom layer under the optical waveguide 110b is a thick insulating layer 310 embedded in the substrate 300, and that the optical waveguide 110b and the gates 110b' of the CMOS transistors in the integrated circuit are defined from a polysilicon layer formed on the substrate 300. Since the refractive indexes of the insulating layer 310 and the ILD layer 350 are smaller than that of silicon, the light entering the silicon optical waveguide 100b is not liable to escape out, so that a loss of the signal magnitude is prevented.

The material of the insulating layer 310 is, for example, silicon oxide. Moreover, a device isolation 320 much thinner than the insulating layer 310 is formed in the substrate 300 in the integrated circuit area, and the source/drain regions 340 of a PMOS or NMOS transistor is formed in the substrate 300 beside the gate 110b' of the transistor.

Since the focusing member of each of the above embodiments of this invention includes multiple levels of conductive plugs and multiple levels of conductive layers, its fabricating process can be integrated with the fabricating process of the multi-level interconnect of the integrated circuit, so that the process time and cost are much reduced.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. An optoelectronic device, comprising:
a substrate;
a bottom layer on the substrate;
an optical waveguide over the bottom layer;
a dielectric layer covering the optical waveguide; and
a focusing member at an edge of the optoelectronic device, comprising multiple levels of conductive plugs and multiple levels of conductive layers located in the dielectric layer over the optical waveguide, wherein the conductive plugs and the conductive layers in combination form an inversed half-boat shape, and a wider end of the inversed half-boat shape faces outside of the optoelectronic device, so as to focus light coming from an optical signal source entering into the optoelectronic device;
wherein refractive indexes of the bottom layer and the dielectric layer are smaller than a refractive index of the optical waveguide.

2. The optoelectronic device of claim 1, wherein the conductive plugs and the conductive layers comprise metal.

3. The optoelectronic device of claim 1, wherein the bottom layer comprises silicon oxide, and the optical waveguide comprises silicon.

4. The optoelectronic device of claim 1, wherein the substrate is a silicon-on-insulator (SOI) substrate, the bottom layer is the insulator of the SOI substrate, and the optical waveguide is defined from the silicon of the SOI substrate.

5. The optoelectronic device of claim 1, wherein the substrate is a bulk substrate, the bottom layer is an insulating layer embedded in the bulk substrate, and the optical waveguide is defined from a polysilicon layer formed on the insulating layer.

6. The optoelectronic device of claim 1, further comprising an integrated circuit fabricated on the substrate, the integrated circuit comprising a multi-level interconnect that is located in the dielectric layer and is formed simultaneously with the conductive plugs and the conductive layers.

7. The optoelectronic device of claim 6, wherein the multi-level interconnect, the conductive plugs and the conductive layers comprise metal.

8. The optoelectronic device of claim 6, wherein the dielectric layer comprises an inter-layer dielectric (ILD) layer and a plurality of inter-metal dielectric (IMD) layers.

9. The optoelectronic device of claim 6, wherein the substrate is a silicon-on-insulator (SOI) substrate, the bottom layer is the insulator of the SOI substrate, and the optical waveguide and an active layer of the integrated circuit are defined from the silicon of the SOI substrate.

10. The optoelectronic device of claim 6, wherein the substrate is a bulk substrate, the bottom layer is an insulating layer embedded in the bulk substrate, and the optical waveguide and gates of CMOS transistors in the integrated circuit are defined from a polysilicon layer formed on the bulk substrate.

* * * * *